United States Patent [19]

Kato et al.

[11] Patent Number: 4,539,359

[45] Date of Patent: Sep. 3, 1985

[54] ONE COMPONENT CURING COMPOSITION

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 520,685

[22] Filed: Aug. 5, 1983

[30] Foreign Application Priority Data

Aug. 18, 1982 [JP] Japan .................. 57-142965

[51] Int. Cl.³ ........................... C08F 8/40
[52] U.S. Cl. ..................... 524/376; 524/379; 524/385; 524/547; 524/555; 524/560; 524/561; 524/562; 524/576; 525/327.4; 525/328.2; 525/329.4; 525/330.3; 525/340; 525/333.3
[58] Field of Search ............ 525/340; 524/376, 379, 524/385

[56] References Cited

U.S. PATENT DOCUMENTS

| | | | |
|---|---|---|---|
| 3,147,313 | 9/1964 | Hsieh | 525/340 |
| 3,544,262 | 12/1970 | Harris et al. | 525/340 |
| 3,803,266 | 4/1974 | Kuble et al. | 525/340 |
| 3,839,272 | 10/1974 | Yankowsky | 525/340 |
| 3,912,672 | 10/1975 | Morris et al. | 525/340 |
| 3,974,132 | 8/1976 | Valdiserri | 525/340 |

FOREIGN PATENT DOCUMENTS

| | | |
|---|---|---|
| 90542 | 3/1961 | Denmark . |
| 838745 | 6/1960 | United Kingdom . |

*Primary Examiner*—Bernard Lipman
*Attorney, Agent, or Firm*—Antonelli, Terry & Wands

[57] ABSTRACT

A one component moisture curable composition containing (A) a hydrolyzable silyl group-containing vinyl polymer and (B) an acid phosphoric compound having

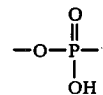

linkage in the molecule as a hardener, which has excellent recoatability, curing property and adhesion to other paint films and is particularly suitable as a coating composition for use in multicoat coating.

9 Claims, No Drawings

ONE COMPONENT CURING COMPOSITION

BACKGROUND OF THE INVENTION

The present invention relates to a one component curing composition which is curable at room temperature or low temperatures by moisture, and more particularly to a one component curing composition containing a hydrolyzable silyl group-containing vinyl polymer which is hard to be subject to the influence of an undercoat and is particularly suitable for use in multicoat coating.

It is known that a silyl group-containing vinyl polymer having on the polymer chain end or the side chain thereof at least one silicon atom, to which a hydrolyzable group is linked, per one polymer molecule is curable by moisture, and is useful for providing a one component curing composition. A one component composition containing the hydrolyzable silyl group-containing vinyl polymer and a hardener or cure accelerating catalyst such as an organo tin compound, an amine compound or an acidic compound is curable at low temperatures by moisture in the atmosphere to form a network structure, thus forming a coating having excellent gloss, weathering resistance, discoloration resistance, solvent resistance, water resistance, heat resistance and hardness. It is possible to use the composition in various purposes, e.g. paint, adhesive, coating material and sealant, by utilizing the above excellent characteristics.

In the case of painting, multicoat coating is usually conducted by using various kinds of paints as an undercoat, an intermediate coat and a top coat. Therefore, it is important that a one component curing composition used as a paint has an excellent adhesive property to an undercoat or a top coat. Also, known one component curing compositions containing silyl group-containing vinyl polymers have the disadvantage. That is to say, in the case that a known urethane resin paint is first applied to form an undercoat (e.g. metallic base) and a one component curing composition, e.g. a coating composition containing a silyl group-containing vinyl polymer, a hardener such as dibutyl tin maleate and a solvent, is then applied to the undercoat, when it is necessary to conduct re-painting some minutes later to repair the paint film, the recoating of the coating composition causes the undercoat of the urethane resin paint to shrink and the appearance of the paint film is remarkably impaired. The initial repairability or recoatability in multicoat coating is very important in practical use.

SUMMARY OF THE INVENTION

It has now been found that, by using an acid phosphoric compound containing a

linkage in the molecule as a hardener for a one component curing composition of a silyl group-containing vinyl polymer, not only the initial repairability in the case where the composition is applied onto an undercoat of a urethane resin paint is improved, but also there is obtained a one component curing composition having a high curing activity, a very excellent initial drying property, a good adhesion property to undercoats of various paints and a good workability.

In accordance with the present invention, there is provided a one component curing composition comprising (A) a vinyl polymer having on the polymer chain end or the side chain thereof at least one silicon atom to which a hydrolyzable group is linked, per one polymer molecule, the main chain of the vinyl polymer consisting essentially of a polymer of a vinyl compound, and (B) an acid phosphoric compound containing a

linkage in the molecule.

The one component curing composition of the present invention has an excellent ability of forming a film without causing problems in multicoat formation on various undercoat paint films.

DETAILED DESCRIPTION

A polymer of which the main chain consists essentially of a polymer of a vinyl compound and which has on the polymer chain end or the side chain thereof at least one silicon atom combined with a hydrolyzable group, preferably at least two silicon atoms each combined with a hydrolyzable group, per one polymer molecule, is used in the present invention as a component (A). The vinyl compound includes, for instance, styrene, acrylates, methacrylates, maleic anhydride, acrylamide, N-methylolacrylamide, and the like, which may be employed along or in admixture thereof. Most of such silyl groups of the polymers (A) are represented by the following formula:

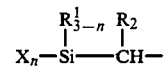

wherein X is a hydrolyzable group selected from the group consisting of a halogen, an alkoxyl group, an alkoxyalkoxyl group, an acyloxyl group, a ketoxymate group, amino group, an acid amide group, aminoxy group, mercapto group and an alkenyloxy group, $R^1$ and $R^2$ are hydrogen or a hydrocarbon group having 1 to 10 carbon atoms selected from the group consisting of an alkyl group, an aryl group and an aralkyl group, and n is an integer of 1 to 3.

The silyl group-containing vinyl polymers used as a component (A) in the present invention can be prepared by various processes, e.g. processes as disclosed in Japanese Unexamined Patent Publication (Tokkyo Kokai) No. 36395/1979, No. 123192/1979 and No. 63351/1982. A process by hydrosilylation of a vinyl polymer having a carbon-carbon double bond with hydrosilane and a process by copolymerization of a vinyl compound and a silyl compound having a copolymerizable double bond are industrially advantageous.

The silyl group-containing vinyl polymer used in the invention is desired to have a number average molecular weight within the range of 1,000 to 30,000, though the molecular weight thereof is not particularly limited thereto. In the case where attention must be paid particularly to the storage stability of a one component curing composition, it is more desirable to use the silyl group-containing vinyl polymer having a number average molecular weight of 1,000 to 15,000.

The silyl group-containing vinyl polymer containing units of an ethylenically unsaturated compound as a comonomer which has active hydrogen, e.g. carboxyl group, hydroxyl group, amino group and acid amide group, shows a further improved close adhesion property to a substrate. The content of such a comonomer is usually from 0.1 to 10% by weight.

Acid phosphonic compounds containing

linkage in the molecule used as a hardener (B) in the present invention include an organic acid phosphate of the general formula:

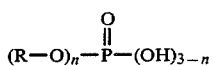

wherein n is 1 or 2 and R is an organic residue, and a titanate compound known as a titanate coupling agent in the field of adhesion and painting.

Typical examples of the organic acid phosphate are

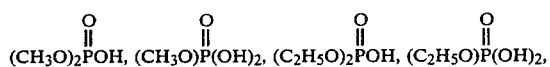

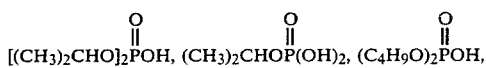

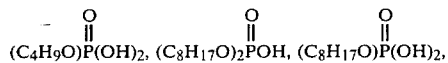

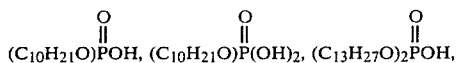

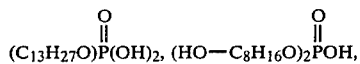

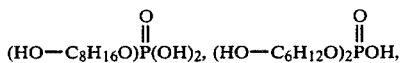

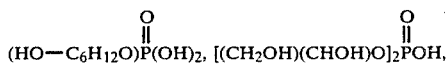

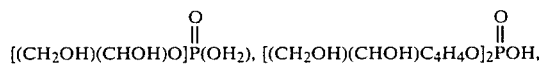

and the like.

Typical examples of the titanate compound are:

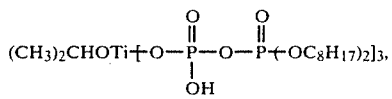

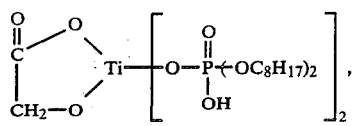

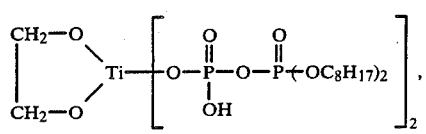

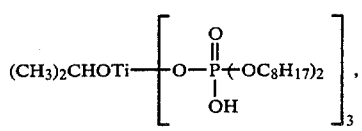

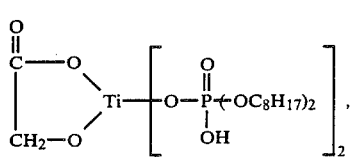

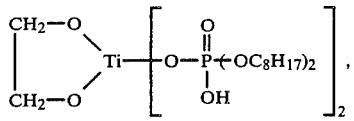

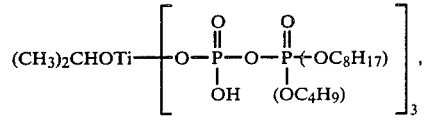

and the like.

The hardener (B) is employed in an amount of 0.01 to 10 parts by weight, preferably 0.1 to 8 parts by weight, per 100 parts by weight of the silyl group-containing vinyl polymer (A).

A solvent may be employed to adjust the concentration of solids matter or viscosity of the composition. Solvents which do not dissolve the silyl group-containing vinyl polymer and the hardener, but do not cause precipitation in the composition when used in combination with good solvents, are usable as well as solvents capable of dissolving the both of the polymer and the hardener. Solvents as used in general paints and coating compositions can be used in the present invention, and include, for instance, aliphatic hydrocarbons, aromatic hydrocarbons, alcohols, ketones, esters, alcohol esters, ketone alcohols, ether alcohols, ketone ethers, ketone esters and ester ethers. The amount of the solvent varies depending on the molecular weight of the silyl group-containing vinyl polymer and the proportions of the used components, and is selected according to the concentration of solids matter or viscosity of the composition required in practical use.

The stability of the composition of the invention is improved by the addition of an alcohol compound and/or a hydrolyzable ester compounds. These stabilizers are usually included in a solvent and admixed with other components. The alcohol compound includes an alkyl alcohol and an ethylene glycol alkyl ether with a $C_1$ to $C_{10}$ alkyl group such as ethyl or butyl cellosovle.

Preferable alkyl alcohols are those having a $C_1$ to $C_{10}$ alkyl group, such as methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol and octyl alcohol.

The hydrolyzable ester compound includes, for instance, a trialkyl orthoformate such as trimethyl orthoformate, triethyl orthoformate, tripropyl orthoformate or tributyl orthoformate; a hydrolyzable silicon compound of the general formula:

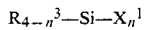

wherein $R^3$ is a monovalent organic group which may contain a functional group, $X^1$ is a hydrolyzable group, e.g. an alkoxyl group, an alkoxyalkoxyl group, phenoxy group, an acyloxyl group, a ketoxymate group, amino group, aminoxy group, an acid amide group or an alkenyloxy group, and n is an integer of 1 to 4, especially 3 or 4; and a partial hydrolysis product of the hydrolyzable silicon compound. Typical examples of the hydrolyzable silicon compound and the partial hydrolysis product thereof are a tetraalkyl orthosilicate such as tetramethyl orthosilicate, tetraethyl orthosilicate, tetrapropyl orthosilicate or tetrabutyl orthosilicate, Ethyl Silicate 40 (commercial name of partially hydrolyzed ethyl silicate made by Nippon Unicar Co., Ltd.), methyltrimethoxysilane, methyltriethoxysilane, ethyltrimethoxysilane, ethyltriethoxysilane, phenyltrimethoxysilane, phenyltriethoxysilane, vinyltrimethoxysilane, vinyltriethoxysilane, γ-methacryloyloxypropyltrimethoxysilane, γ-mercaptopropyltrimethoxysilane, γ-glycidoxypropyltrimethoxysilane, γ-aminopropyltriethoxysilane and N-β-aminoethyl-γ-aminopropyltrimethoxysilane.

The above-mentioned stabilizer such as the alcohol compound or the hydrolyzable ester compound is employed in an amount of 0 to 300 parts by weight per 100 parts by weight of the component (A).

Also, the adhesion property of the composition is further improved by the addition of a silane coupling agent, or by the addition of a nitrogen-containing compound having at least one silicon atom combined with a hydrolyzable group in one molecule such as a reaction product of an amine type silane coupling agent and an epoxy compound or a reaction product of an epoxy type silane coupling agent and an amine compound.

The composition of the present invention may further contain usual additives such as fillers, pigments, ultraviolet absorbents, antioxidants, flatting agents and levelling agents in known effective concentrations.

The one component curing composition of the present invention is curable at ordinary temperature, and provides a cured product having excellent properties, e.g. adhesion property, weathering resistance and recoatability. Therefore, the composition of the invention is useful for the various purposes, e.g. paints, coating materials, primers and adhesives for the surfaces of inorganic and organic materials. The composition is particularly suitable as an anticorrosive finishing paint for a bridge, a top coat, an automotive refinishing paint and a paint for the surfaces of organic materials from the viewpoint of low temperature curing property.

It is possible to blend the composition of the invention with various resins used in paints, coating materials, primers and adhesives. Therefore, the composition of the invention can be admixed in suitable proportions, for instance, with lacquer, acrylic lacquer, thermosetting acrylic paint, alkyd paint, melamine paint, epoxy paint or silicone paint, whereby the physical properties such as adhesion property and weathering resistance of these paints or coatings can be improved.

The present invention is more specifically described and explained by means of the following Examples in which all parts and % are by weight unless otherwise noted. It is to be understood that the present invention is not limited to the Examples, and various changes and modifications may be made in the invention without departing from the spirit and scope thereof.

The following Reference Examples are also presented to illustrate the preparation of the silyl group-containing vinyl polymer used as a component (A) in the present invention.

REFERENCE EXAMPLE 1

To 50 g. of toluene heated at 120° C. was added dropwise under reflux over 5 hours a mixture consisting of 150 g. of styrene, 200 g. of butyl acrylate, 500 g. of methyl methacrylate, 150 g. of γ-methacryloyloxypropyltrimethoxysilane, 50 g. of azobisisobutyronitrile, 180 g. of toluene and 180 g. of butyl acetate. A mixture of 10 g. of azobisisobutyronitrile and 50 g. of butyl acetate was further added dropwise to the system over 1 hour, and the post-polymerization was then conducted for 2 hours. The solid content of the obtained reaction mixture in the form of a solution was 69%. The viscosity of the solution was 70 poises at 25° C. The thus prepared silyl group-containing vinyl polymer had a number average molecular weight of 5,000 measured by gel permeation chromatography.

REFERENCE EXAMPLE 2

To 50 g. of toluene heated at 120° C. was added dropwise under reflux over 5 hours a mixture consisting of 150 g. of styrene, 200 g. of butyl acrylate, 480 g. of methyl methacrylate, 150 g. of γ-methacryloyloxypropyltrimethoxysilane, 20 g. of acrylamide, 50 g. of azoisobutyronitrile, 180 g. of toluene and 180 g. of butyl acetate. A mixture of 10 g. of azoisobutyronitrile and 50 g. of butyl acetate was further added dropwise over 1 hour, and the post-polymerization was then conducted for 2 hours to give a solution having a solid content of 68.5% and a viscosity of 80 poises at 25° C. The thus prepared silyl group-containing vinyl polymer had a number average molecular weight of 5,000.

REFERENCE EXAMPLE 3

To 50 g. of toluene heated at 120° C. was added dropwise under reflux over 5 hours a mixture consisting of 150 g. of styrene, 680 g. of butyl methacrylate, 150 g. of γ-methacryloyloxypropyltrimethoxysilane, 20 g. of 2-hydroxyethylmethacrylate, 50 g. of azoisobutyronitrile, 180 g. of toluene and 180 g. of butyl acetate. A mixture of 10 g. of azoisobutyronitrile and 50 g. of butyl acetate was further added dropwise over 1 hour, and the post-polymerization was then conducted for 2 hours to give a solution having a solid content of 69% and a viscosity of 75 poises at 25° C. The thus prepared sily group-containing vinyl polymer had a number average molecular weight of 5,000.

EXAMPLES 1 TO 3 AND COMPARATIVE EXAMPLE 1

To each of the silyl group-containing vinyl polymers obtained in Reference Examples 1 to 3 were added a hardener and a solvent containing a stabilizer to give a one component curing composition having a solid content of 40%, as shown in Table 1.

The initial repairability, curing property, adhesion property and storage stability of the obtained one component curing compositions were examined according to the following testing methods. The results are shown in Table 2 together with the results for a one component curing composition containing an organo tin compound as a hardener (Comparative Exxample 1).

Initial repairability

A urethane metallic-base paint (commercially available under the commercial name "Hi Art" made by Isamu Toryo Kabushiki Kaisha) was applied to a steel plate. After 5 to 10 minutes, a one component curing composition was applied to the basecoat. After allowing to stand for 30 minutes to 1 hour at 35° C., the same one component curing compositions was applied again, and the paint film shrinkage and the movement of the metal were observed by the naked eye.

Curing property and adhesion property

A urethane metallic-base paint ("Hi Art" made by Isamu Toryo Kabushiki Kaisha) or a lacquer metallic-base paint (commercially available under the commercial name "Acric No. 1000" made by KANSAI PAINT CO., LTD.) was applied to a steel plate, and a one component curing composition was then applied and heated at 60° C. for 40 minutes. The curing property was estimated by measuring the pencil hardness according to JIS K 5400 and the gasoline resistance (regular gasoline, dipping for 1 hour). The adhesion between the metallic basecoat and the top clear layer was estimated by cross-cutting the film and peeling off with a cellophane adhesive tape. The gasoline resistance and adhesion property were examined with respect to a coated steel plate allowed to stand for 7 days.

Storage stability

A one component curing composition was stored in a sealed container at 50° C. for one month, and the change in viscosity was observed. The viscosity was measured by employing a Brookfield viscometer.

vide a film having excellent initial curing property and adhesion property to various undercoats.

In addition to the ingredients used in the Examples, other ingredients can be used in the Examples as set forth in the specification to obtain substantially the same results.

What we claim is:

1. A one component curing composition comprising (A) a vinyl polymer having on the main polymer chain end or a side chain thereof at least one silyl group containing a silicon atom to which a hydrolyzable group is linked, per one polymer molecule, the main chain of the vinyl polymer consisting essentially of a polymer of a vinyl monomer, and from 0.01 to 10 parts by weight of (B) an acid phosphoric compound containing a

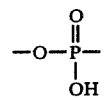

linkage in the molecule per 100 parts by weight of the vinyl polymer (A); said acid phosphoric compound being a compound of the formula:

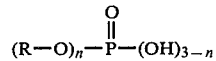

wherein n is 1 or 2 and R is an organic residue or a titanate coupling agent containing the

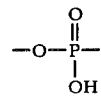

linkage in the molecule.

2. The composition of claim 1, which contains a solvent.

TABLE 1

|  | Silyl group-containing vinyl polymer | Hardener (PHR*) | Solvent | Stabilizer (PHR*) |
| --- | --- | --- | --- | --- |
| Ex. 1 | Ref. Ex. 1 | Dibutyl phosphate (1) | Xylene and butyl acetate | Methanol (5) |
| Ex. 2 | Ref. Ex. 2 | Ken-React** (1) | Xylene and butyl acetate | Methyl orthoformate (5) |
| Ex. 3 | Ref. Ex. 3 | Dioctyl phosphate (1) | Xylene and butyl acetate | Methyl trimethoxysilane (5) |
| Com. Ex. 1 | Ref. Ex. 2 | Dibutyl tin dilaurate (1) | Xylene and butyl acetate | Methyl orthoformate (5) |

*Part by weight per 100 parts by weight of the silyl group-containing vinyl polymer
**Commercial name of a titanate coupling agent [bis(dioctylpyrophosphate) oxyacetate titanate] made by Ken-Rich Petro Chemicals Co.

TABLE 2

|  | Initial repairability | Curing property and adhesion property | | | | | | Storage stability (viscosity, cP) | |
| --- | --- | --- | --- | --- | --- | --- | --- | --- | --- |
|  |  | Metallic undercoat | Pencil hardness | | | Gasoline resistance (after 7 days) | Adhesion property (after 7 days) | Initial | After 30 days at 50° C. |
|  |  |  | After 1 day | After 4 days | After 7 days |  |  |  |  |
| Ex. 1 | good | lacquer | B | HB | H | good | good | 35 | 40 |
| Ex. 2 | good | urethane | B | H | H | good | good | 35 | 40 |
| Ex. 3 | good | urethane | B | F | H | good | good | 35 | 38 |
| Com. Ex. 1 | shrinkage | urethane | 2B | HB | F | good | good | 35 | 45 |

It is observed in Table 2 that the one component curing compositions of the present invention have excellent initial repairability and storage stability and pro- 3. The composition of claim 2, wherein said solvent contains an alcohol with a $C_1$ to $C_{10}$ alkyl group selected from the group consisting of an alkyl alcohol and an ethylene glycol alkyl ether.

4. The composition of claim 1, which further contains a hydrolyzable ester compound selected from the group consisting of a trialkyl orthoformate, a hydrolyzable silicon compound of the general formula:

$$R_{4-n}^3-Si-X_n^1$$

wherein $R^3$ is a monovalent organic group, $X^1$ is a hydrolyzable group selected from the group consisting of an alkoxyl group, an alkoxyalkoxyl group, phenoxy group, an acylocyl group, a ketoxymate group, amino group, aminoxy group, an acid amide group and an alkenyloxy group, and n is an integer of 1 to 4, and a partial hydrolysis product of the hydrolyzable silicon compound in an amount of 0 to 300 parts by weight per 100 parts by weight of the vinyl polymer (A).

5. The composition of claim 1, wherein the vinyl polymer (A) is prepared from a monomeric mixture containing said vinyl monomer and from 0.1 to 10% by weight of an ethylenically unsaturated comonomer having a group contaning active hydrogen selected from the group consisting of a carboxyl group, a hydroxyl group, an amino group, and an acid amide group.

6. The composition of claim 1, wherein said acid phosphoric compound (B) is selected from the group consisting of

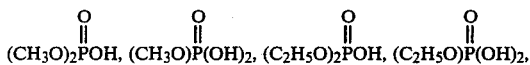

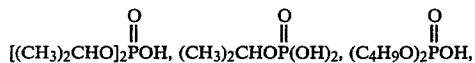

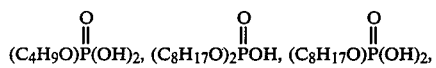

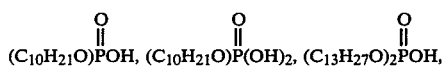

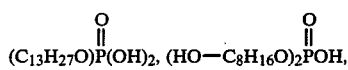

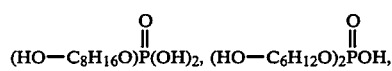

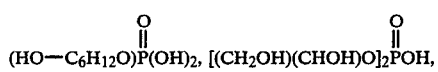

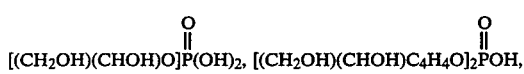

and 

7. The composition of claim 1, wherein the acid phosphoric compound (B) is selected from the group consisting of

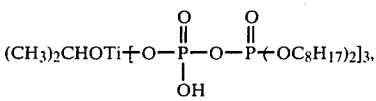

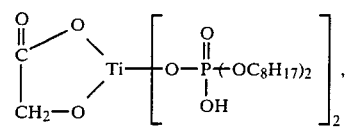

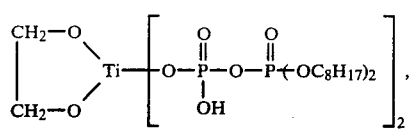

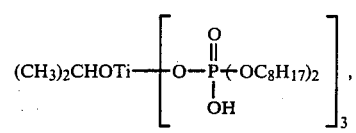

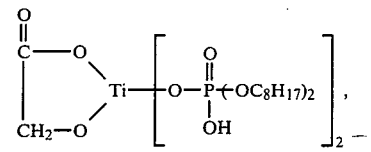

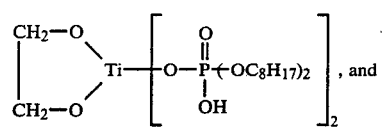

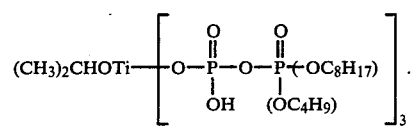

8. The composition of claim 1, wherein said silyl group is represented by the formula:

$$X_n-\underset{\underset{\text{CH}-}{|}}{\overset{\overset{R_{3-n}^1}{|}}{Si}}\overset{R_2}{\underset{|}{\text{—}}}$$

wherein X is a hydrolyzable group selected from the group consisting of halogen, alkoxy, alkoxyalkoxyl, acyloxyl, ketoxymate, amino, acid amide, aminoxy, mercapto and alkenyloxy group, $R^1$ and $R^2$ are hydrogen or a hydrocarbon group having 1 to 10 carbon atoms selected from the group consisting of an alkyl group an aryl group and an aralkyl group and n is an integer of 1 to 3.

9. The composition of claim 1, wherein said vinyl monomer is selected from the group consisting of styrene, an acrylate, a methacrylate, maleic anhydride, acrylamide, and N-methylolacrylamide.

* * * * *